United States Patent
Gemulla et al.

(10) Patent No.: US 8,983,879 B2
(45) Date of Patent: *Mar. 17, 2015

(54) SYSTEMS AND METHODS FOR LARGE-SCALE RANDOMIZED OPTIMIZATION FOR PROBLEMS WITH DECOMPOSABLE LOSS FUNCTIONS

(75) Inventors: Rainer Gemulla, Saarbruecken (DE); Peter Jay Haas, San Jose, CA (US); John Sismanis, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,618

(22) Filed: Aug. 27, 2012

(65) Prior Publication Data
US 2012/0331025 A1    Dec. 27, 2012

Related U.S. Application Data

(63) Continuation of application No. 13/169,618, filed on Jun. 27, 2011.

(51) Int. Cl.
| | |
|---|---|
| *G06F 15/18* | (2006.01) |
| *G06F 15/78* | (2006.01) |
| *G06F 7/58* | (2006.01) |
| *G06F 9/06* | (2006.01) |
| *G06F 17/10* | (2006.01) |
| *G06F 17/11* | (2006.01) |

(52) U.S. Cl.
CPC ............. *G06F 15/781* (2013.01); *G06F 7/588* (2013.01); *G06F 9/06* (2013.01); *G06F 17/10* (2013.01); *G06F 17/11* (2013.01)

USPC .......................................................... 706/12

(58) Field of Classification Search
USPC .......................................................... 706/12
See application file for complete search history.

(56) References Cited

U.S. PATENT DOCUMENTS

| | | | | |
|---|---|---|---|---|
| 7,953,676 | B2 * | 5/2011 | Agarwal et al. ................. | 706/12 |
| 8,190,549 | B2 * | 5/2012 | Yang et al. ...................... | 706/46 |
| 2011/0231336 | A1 * | 9/2011 | Hu et al. ........................ | 705/348 |
| 2012/0023045 | A1 * | 1/2012 | Steck .............................. | 706/12 |

OTHER PUBLICATIONS

Relational Learning via Collective Matrix Factorization by Singh et al., published Aug. 2008.*
Distributed Nonnegative Matrix Factorization for Web-Scale Dyadic Data Analysis on MapReduce, by Liu et al., published Apr. 2010.*
A Probabilistic Framework for Relational Clustering, by Long et al., published Dec. 2007.*

(Continued)

*Primary Examiner* — Jeffrey A Gaffin
*Assistant Examiner* — Thomas Fink
(74) *Attorney, Agent, or Firm* — Ference & Associates LLC

(57) ABSTRACT

Systems and methods directed toward processing optimization problems using loss functions, wherein a loss function is decomposed into at least one stratum loss function, a loss is decreased for each stratum loss function to a predefined stratum loss threshold individually using gradient descent, and the overall loss is decreased to a predefined threshold for the loss function by appropriately ordering the processing of the strata and spending appropriate processing time in each stratum. Other embodiments and aspects are also described herein.

13 Claims, 12 Drawing Sheets

(56) References Cited

OTHER PUBLICATIONS

SoRec: Social Recommendation Using Probabilistic Matrix Factorization, by Ma et al., published Oct. 2008.*

Wikipedia web page, http://en.wikipedia.org/wiki/Matrix_decomposition, published Jun. 2013.*

* cited by examiner

SGD for Matrix Factorization Process

Require: A training set $Z$, initial values $W_0$ and $H_0$
while not converged do /* step */
   Select a training point $(i,j) \in Z$ uniformly at random.
   $W'_{i*} \leftarrow W_{i*} - \epsilon_n N \frac{\partial}{\partial W_{i*}} l(V_{ij}, W_{i*}, H_{*j})$
   $H_{*j} \leftarrow H_{*j} - \epsilon_n N \frac{\partial}{\partial H_{*j}} l(V_{ij}, W_{i*}, H_{*j})$
   $W_{i*} \leftarrow W'_{i*}$
end while

FIG. 7

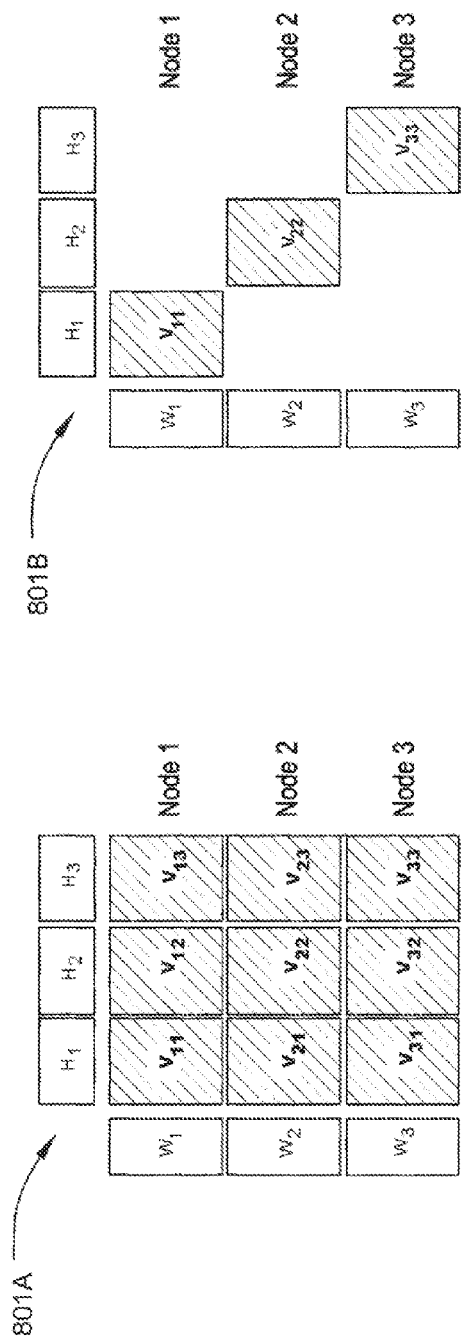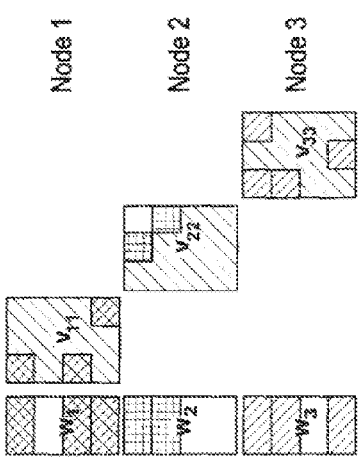
FIG. 8A
FIG. 8B
FIG. 8C

DSGD for Matrix Factorization Process

Require: $Z$, $W_0$, $H_0$, cluster size $d$
  $W \leftarrow W_0$
  $H \leftarrow H_0$
  Block $Z / W / H$ into $d \times d / d \times 1 / 1 \times d$ blocks
  while not converged do /* epoch */
    Pick step size $\epsilon$
    for $s = 1, \ldots, d$ do /* subepoch */
      Pick $d$ blocks $\{Z^{1j_1}, \ldots, Z^{dj_d}\}$ to form a stratum
      for $b = 1, \ldots, d$ do /* in parallel */
        Run SGD on the training points in $Z^{bj_b}$ (step size $= \epsilon$)
      end for
    end for
  end while

FIG. 9

SYSTEMS AND METHODS FOR LARGE-SCALE RANDOMIZED OPTIMIZATION FOR PROBLEMS WITH DECOMPOSABLE LOSS FUNCTIONS

CROSS REFERENCE TO RELATED APPLICATION

The application is a continuation of U.S. patent application Ser. No. 13/169,618, entitled SYSTEMS AND METHODS FOR LARGE-SCALE RANDOMIZED OPTIMIZATION FOR PROBLEMS WITH DECOMPOSABLE LOSS FUNCTIONS, filed on Jun. 27, 2011, which is incorporated by reference in its entirety.

BACKGROUND

As Web 2.0 and enterprise-cloud applications have proliferated, data collection processes increasingly require the ability to efficiently and effectively handle web-scale datasets. Such processes include, but are not limited to, chemical and mechanical manufacturing optimizations or economic regret formulations, where the corresponding chemical or mechanical waste or economic loss is minimized. Of particular interest is the analysis of "dyadic data," which concerns discovering and capturing interactions between two entities. For example, certain applications involve topic detection and keyword search, where the corresponding entities are documents and terms. Other examples concern news personalization with user and story entities, and recommendation systems with user and item entities. In large applications, these problems often involve matrices with millions of rows (e.g., distinct customers) and millions of columns (e.g., distinct items), ultimately resulting in billions of populated cells (e.g., transactions between customers and items). In these data collection applications, the corresponding optimization problem is to compute row and column profiles, such that the loss between the "predicted" cells (from the corresponding row and column profiles) and the actual cells is minimized.

BRIEF SUMMARY

In summary, one aspect provides a method comprising: decomposing a primary loss function into at least one stratum loss function; decreasing a stratum loss to a predefined stratum loss threshold for each at least one stratum loss function by processing each at least one stratum loss function individually using gradient descent; and decreasing a primary loss to a predefined primary loss threshold of the primary loss function by processing each of the at least one stratum loss function according to a stratum sequence, wherein a processing time of each of the at least one stratum loss function is proportional to a weight of the at least one stratum loss function.

The foregoing is a summary and thus may contain simplifications, generalizations, and omissions of detail; consequently, those skilled in the art will appreciate that the summary is illustrative only and is not intended to be in any way limiting. For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 7 Provides an example SGD matrix factorization process.

FIGS. 8A-8C provide an example SSGD process.

FIG. 9 provides an example distributed stochastic gradient descent (DSGD) matrix factorization process.

DETAILED DESCRIPTION

Figure 1:
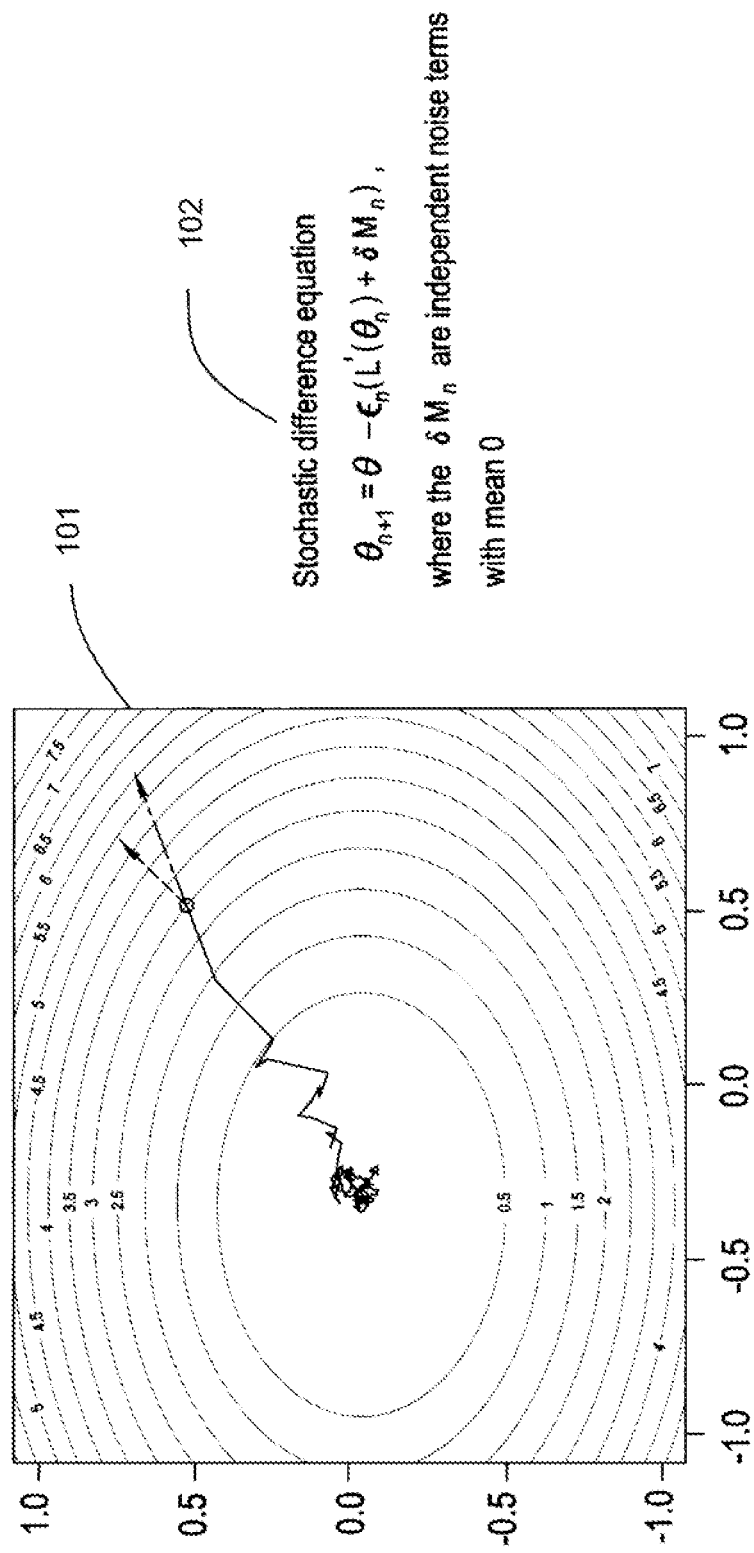
FIG. 1 provides an example of stochastic gradient descent (SGD).

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of certain example embodiments.

Reference throughout this specification to an "embodiment" or "embodiment(s)" means that a particular feature, structure, or characteristic described in connection with the embodiment is included in at least one embodiment. Thus, the appearances of "embodiment" or "embodiment(s)" in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid prolixity. Data collection and processing functions are continually being re-designed to handle the increasing size and scope of modern web-scale datasets, such as those associated with Web 2.0 and enterprise-cloud applications. One common data processing challenge concerns optimization problems, where a large number of parameters must be optimized. As such, optimization problems generally involve using and determining certain approximations concerning data from a subject data set. Loss functions provide a process for representing the loss associated with an optimization problem approximation varying from a desired or true value. Accordingly, a loss function may be minimized or decreased, for example, to a predefined threshold to achieve a desired outcome for an optimization problem.

Loss functions have many applications, including matrix factorization, chemical and manufacturing processes, and economic regret formulations. For example, a loss function may be configured to minimize the economic loss resulting from a non-conforming product produced according to a certain manufacturing process. According to current technology, loss functions process the subject data set or process in only one comprehensive iteration. For example, a loss function using stochastic gradient descent (SGD) according to current technology would run SGD on an entire loss function configured for the dataset or process. In addition, existing technology mainly provides for specialized loss functions that are configured for specific applications, such as a particular manufacturing process or economic event.

Embodiments provide for a loss function process generalized to operate within any applicable loss-minimization problem. According to embodiments, applicable loss minimization problems may include loss minimization problems in which the loss function has a decomposable form. As a non-limiting example, embodiments provide that a decomposable form may involve expressing a loss function as a weighted sum of loss minimization components. As a non-limiting example, a component may be comprised of a local loss function. According to embodiments, each component may be considered a stratum, and the loss for each component may be processed to provide a local or stratum loss. For example, if a loss function has multiple components, a process according to embodiments will minimize a first component, then a second component, and so forth until all components have been minimized. Embodiments provide that the stratum losses may be summed to provide a global loss representing the minimum loss for the overall loss function.

A common optimization technique is continuous gradient descent (CGD) that finds a minimum $\theta^*$ of a loss function L. CGD involves determining a starting point $(\theta_0)$, computing a gradient $L'(\theta_0)$, and moving toward the minimum in the opposite direction of the gradient. Throughout the disclosure, $\theta$ represents arguments to a function or process, unless stated otherwise. The following differential equation is associated with CGD:

$$\frac{\partial \theta(t)}{\partial t} = -L'(\theta(t)),$$

with a boundary condition of $\theta(0)=\theta_0$. Under certain conditions, it can be shown that asymptotically $\theta(t) \to \theta^*$.

Discrete gradient descent (DGD) provides a computer friendly process for determining a minimum loss by finding a minimum $\theta^*$ of a loss function L. DGD involves ascertaining a starting point $(\theta_0)$, computing a gradient $L'(\theta_0)$, and moving toward the minimum in the opposite direction of the gradient. The following difference equation is associated with the DGD method: $\theta_{n+1}=\theta_n-\in_n L'(\theta_n)$. In addition, under certain conditions, DGD approximates CGD and converges to a local minimum.

Stochastic gradient descent (SGD) determines the parameters that minimize the loss function L by using noisy observations $\hat{L}(\theta)$ of $L'(\theta)$, the function's gradient with respect to $\theta$. Starting with some initial value $\theta_0$, SGD refines the parameter value by iterating the stochastic difference equation as follows:

$$\theta_{n+1}=\theta_n-\in_n \hat{L}'\theta_n, \quad (1)$$

where N denotes the step number and $\{\in_N\}$ is a sequence of decreasing step sizes. Since $L'(\theta_n)$ is the direction of steepest descent, equation (1) constitutes a noisy version of discrete gradient descent. Among other characteristics, stochastic approximation may be used to show that, under certain regularity conditions, noise in the gradient estimates "averages out" and SGD converges to the set of stationary points satisfying $L'(\theta)=0$. These stationary points may represent certain characteristics, including minima, maxima, or saddle points.

Convergence to a maximum or saddle point may be considered unlikely because the noise in the gradient estimates reduces the likelihood of getting stuck at such points. Thus $\{\theta_n\}$ typically converges to a local minimum of L. A variety of methods may be used to increase the likelihood of finding a global minimum, including, but not limited to, running SGD multiple times and starting from a set of randomly chosen initial solutions.

Referring to FIG. 1, therein is depicted an example of SGD. A graph 101 illustrates SGD that finds a minimum $\theta^*$ of a function L. SGD involves determining a starting point $(\theta_0)$, determining an approximate gradient $\hat{L}'(\theta_0)$, and moving "approximately" toward the minimum in the opposite direction of the gradient. Also shown in FIG. 1, is a stochastic difference equation 102 associated with SGD. In addition, under certain conditions, such as $n \to \infty$, SGD approximates CGD.

As demonstrated in the SGD graph 101 of FIG. 1, the gradient representation is "noisy" because the process does not computes the exact gradient but rather approximations of the gradient. However, this process is faster because such approximate gradients can typically be computed much faster than the exact gradients. Although the SGD descent comprises more noise than, for example CGD or DGD, it arrives at the minimum nonetheless. In addition, SGD converges more efficiently than other GD processes because the advantage of being able to take more steps per unit of computation time outweighs the disadvantage of taking steps in only the approximately best direction.

In addition, one may use an additional projection, $\Pi_H$, that keeps the iterate in a given constraint set H. For example, processes may be directed toward nonnegative matrix factorizations, which may correspond to setting $H=\{\theta:\theta\geq 0\}$. Such processes may take the following form:

$$\theta_{n+1}=\Pi_H[\theta_n-\in_n \hat{L}'(\theta_n)] \quad (2)$$

In addition to the set of stationary points, the projected process may converge to a set of "chain recurrent" points, which may be influenced by the boundary of the constraint set H.

Embodiments break the optimization problem into smaller sub-problems and describe effective, parallel and distributed techniques for such data collection processes. In addition, embodiments provide a process for solving optimization problems and, in particular, for optimization problems minimizing loss through one or more loss functions. Embodiments provide for a general stratified stochastic gradient descent (SSGD) process, wherein one or more loss functions are expressed as a weighted sum of loss function terms. According to embodiments, SSGD may be applied to a large range of optimization problems where applicable loss functions have a decomposable form. In addition, further embodiments provide methods and systems for applying SSGD to obtain an efficient distributed stochastic gradient descent (DSGD) matrix factorization process.

According to embodiments, the SSGD loss function $L(\theta)$ is decomposed into a weighted sum of loss functions $L_s(\theta)$ as follows:

$$L(\theta)=w_1 L_1(\theta)+w_2 L_2(\theta)+ \ldots +w_q L_q(\theta), \quad (3)$$

where, without a loss of generality, $0<w_s\leq 1$ and $\Sigma w_s=1$. Index s is referred to as the stratum, $L_s$ as the loss function of stratum s, and $w_s$ as the weight of stratum s. In general, strata often correspond to a part or partition of some underlying dataset. As a non-limiting example, $L_s$ may be the loss incurred on the respective partition, wherein the overall loss is obtained by summing up the weighted per-partition losses. However, the decomposition of L may be arbitrary, wherein there may or may not be an underlying data partitioning. According to embodiments, there is some freedom of choice of $w_s$, such as being altered to arbitrary values by appropriately modifying the stratum loss functions. Embodiments provide that this freedom of choice gives opportunities for optimization.

Embodiments run SSGD on a single stratum at a time, but switch strata in a way that guarantees correctness. The following non-limiting example provides an illustration of the process according to embodiments. In a potentially random stratum sequence $\{\gamma_n\}$, where each $\gamma_n$ takes values in $\{1, \ldots, Q\}$ and the stratum is determined to use the $N^{th}$ iteration. Using a noisy observation $\hat{L}'\gamma_n$ of the gradient $L'\gamma_n$, an update rule $\theta_{n+1} = \Pi_H[\theta_n - \epsilon_n \hat{L}'_{\gamma_n}(\theta_n)]$ may be obtained. The sequence $\{\gamma_n\}$ has to be chosen carefully in order to establish convergence to the stationary, or chain-recurrent, points of L. In addition, because each step of the process proceeds approximately in the "wrong" direction, that is, $-L'_{\gamma_n}(\theta_n)$ rather than $-L'(\theta_n)$, it may not be obvious that the process will lead to convergence at all. However, certain embodiments provide that SSGD will indeed converge under appropriate regularity conditions provided that, in essence, the "time" spent on each stratum is proportional to its weight.

According to embodiments, step-size conditions involve the sequence $\{\epsilon_N\}$, which may converge to 0 at the "right speed." Embodiments provide for at least two step-size conditions, including the following: (1) A first step size condition provides that the step sizes may slowly approach zero in that $\epsilon_n \to 0$ and $\Sigma\epsilon_n \to \infty$; and (2) the step sizes decrease "quickly enough" in that $\Sigma\epsilon_n^2 < \infty$. The simplest valid choice is $\epsilon_n = 1/N$. A non-limiting example of a sufficient set of loss conditions includes H being a hyperrectangle, L being bounded in H, and L being twice continuously differentiable. Regarding stratification, embodiments require that the estimates $L'_s(\theta)$ of the gradient $L'_s(\theta)$ of stratum s be unbiased, have bounded second moment for $\theta \in H$, and do not depend on the past. DSGD according to embodiments satisfies these conditions by design. Embodiments provide for a first condition wherein the step sizes satisfy $(\epsilon_n - \epsilon_{n+1})/\epsilon_n = O(\epsilon_n)$ and the $\gamma_n$ are chosen such that the directions "average out correctly" in the sense that, for any $\theta \in H$:

$$\lim_{n \to \infty} \epsilon_n \sum_{i=0}^{n-1} [L'_{\gamma_i}(\theta) - L'(\theta)] = 0$$

A non-restrictive example provides that if $\epsilon_n$ were equal to 1/N, then the $N^{th}$ term would represent the empirical average deviation from the true gradient over the first n steps. In addition, if all conditions hold, then the sequence $\{\theta_n\}$ converges almost surely to the set of limit points of the "projected ODE" in H, taken over all initial conditions, provides the following: $\dot{\theta} = -L'(\theta) + z$. In this non-restrictive example, z is the minimum force required to keep the solution in H, wherein the limit points consist of the set of stationary points of L in H (z=0), as well as a set of chain-recurrent points on the boundary of H (z≠0). According to embodiments, SSGD may converge to a local minimum, such that demonstrating the correctness of SSGD may involve demonstrating that the first condition, described above, holds. As a non-limiting example, sufficient conditions on $L(\theta)$, step sizes $\{\epsilon_n\}$, and the stratum sequence $\{\gamma_n\}$ may be provided such that the first condition holds.

According to embodiments, the sequence $\{\gamma_n\}$ may be regenerative, such that an increasing sequence of finite random indices $0 = \beta(0) < \beta(1) < \beta(2) < \ldots$ that serves to decompose $\{\gamma_n\}$ into consecutive, independent and identically distributed (i.i.d.) cycles $\{C_K\}$, with $C_K = \{\gamma_{\beta(k-1)}, \gamma_{\beta(k-1)+1}, \ldots, \gamma_{\beta(k)-1}\}$ for $K \geq 1$. Embodiments provide that the cycles need not directly correspond to strata. As such, embodiments utilize strategies in which a cycle comprises multiple strata. A non-restrictive and illustrative example provides that at each $\beta(i)$, the stratum may be selected according to a probability distribution that is independent of past selections, and the future sequence of selections after step $\beta(i)$ looks probabilistically identical to the sequence of selections after step $\beta(0)$. In addition, the length $\tau_k$ of the $K^{th}$ cycle may be given by $\tau_k = \beta(k) - \beta(k-1)$. Furthermore, letting $I_{\gamma n = s}$ be the indicator variable for the event that stratum s is chosen in the $N^{th}$ step, results in the following definition:

$$X_k(s) = \sum_{n=(k-1)}^{\beta(k)-1} I_{\gamma n = s} - w_s,$$

for $1 \leq s \leq D$. It follows from the regenerative property that the pairs $\{(X_k(s), \tau_k)\}$ are i.i.d. for each s. Embodiments provide for a third principle in which, under regularity conditions, any regenerative sequence $\gamma_n$ may be selected such that $E[X_1(s)] = 0$ for all strata. The third principle provides that if it is supposed that $L(\theta)$ is differentiable on H and $\sup_{\theta \in H} |L'_s(\theta)| < \infty$ for $1 \leq s \leq d$ and $\theta \in H$, $\epsilon_n = O(n^{-\alpha})$ for some $\alpha \in (0.5, 1]$ and that $(\epsilon_n - \epsilon_{n+1})/\epsilon_n = O(\epsilon_n)$, and $\{\gamma_n\}$ is regenerative with $E[\tau_1^{1/\alpha}] < \infty$ and $E[X_1(s)] = 0$ for $1 \leq s \leq D$, then the first condition holds.

The condition $E[X_1(s)] = 0$ essentially requires that, for each stratum s, the expected fraction of visits to s in a cycle equals $w_S$. The finite-moment condition is typically satisfied whenever the number of successive steps taken within a stratum is bounded with a probability of one (1).

Figure 2A:
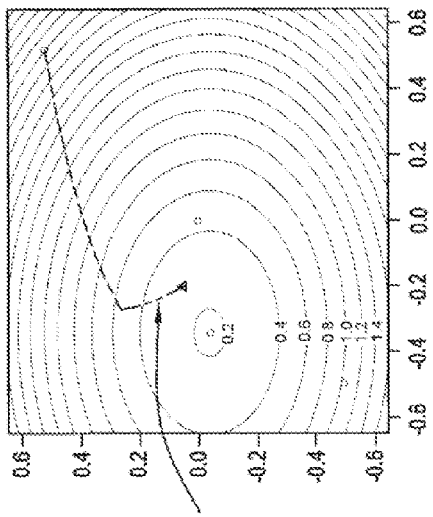
FIGS. 2A-2D provide graphs depicting example stratified stochastic gradient descent (SSGD) cycles for two strata.
Figure 2B:
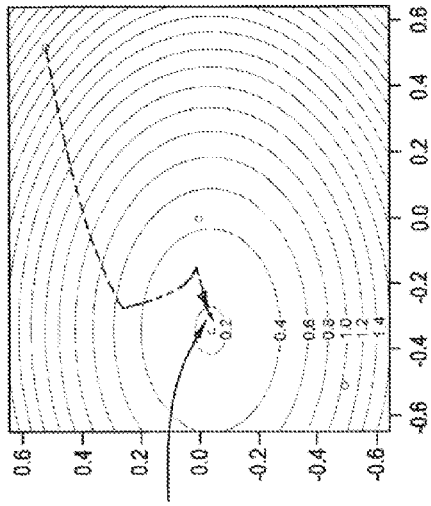
Figure 2C:
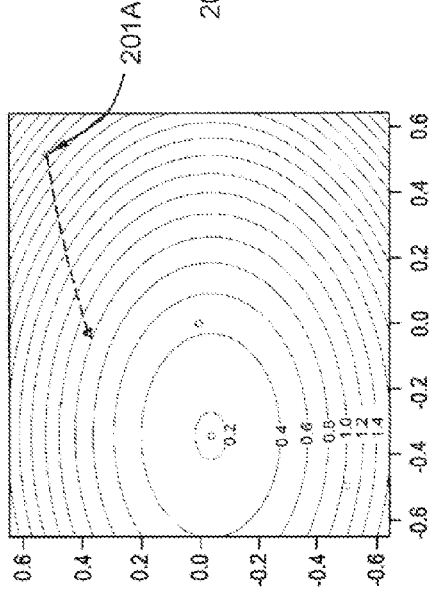
Figure 2D:
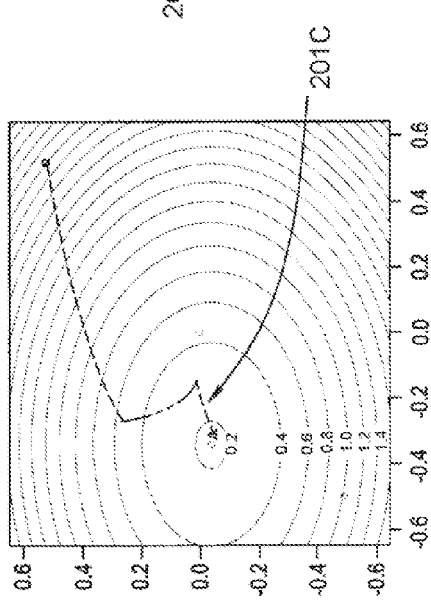
Figure 3:
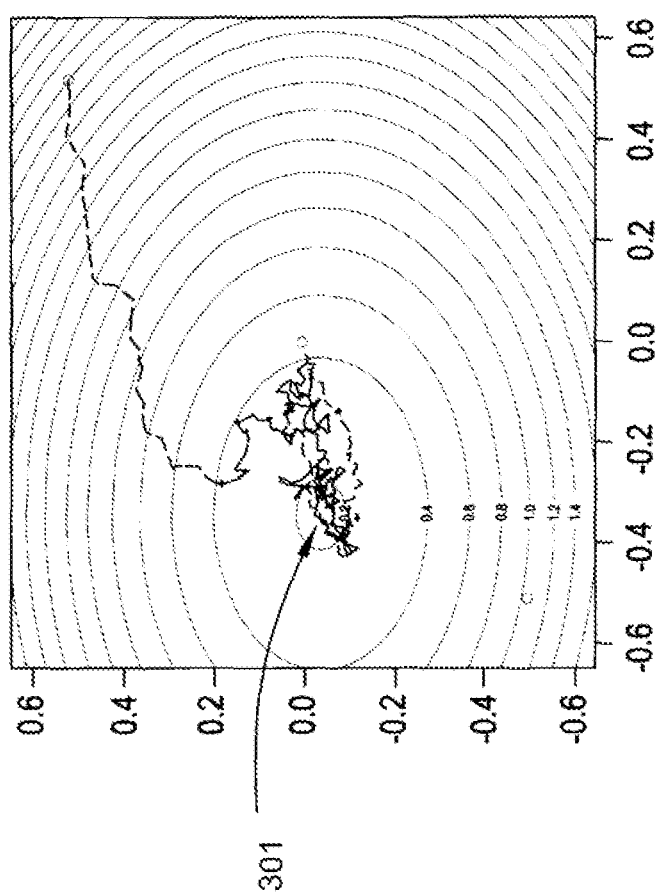
FIG. 3 provides a graph depicting an example of 100 cycles of SSGD.

Referring now to FIGS. 2A-2D, therein is depicted an example of cycles of SSGD for two strata, $L_1$ and $L_2$ according to an embodiment. FIG. 2A illustrates A first cycle for stratum $L_1$ 201A, FIG. 2B illustrates a first cycle for stratum $L_2$ 201B, FIG. 2C illustrates a second cycle for $L_1$ 201C, and FIG. 2D illustrates second cycle for $L_2$ 201D. In FIG. 3, therein is provided a graph depicting 100 cycles of SSGD according to embodiments wherein the paths have converged to a local minimum 301.

As described above, one illustrative and non-restrictive example use of a loss function may involve minimizing the loss of approximating missing matrix entries during a matrix factorization process. According to current technology, low-rank matrix factorizations are being used to handle modern web-scale datasets because, for example, they are fundamental to a variety of data collection tasks that have been applied to massive datasets with increased frequency. Low-rank matrix factorizations may be used for many processes, including analysis of "dyadic data," which aims at discovering and capturing the interactions between two entities. Illustrative interactions may involve viewer ratings of movies, online purchases of goods, or click-throughs and web sites. An increasingly prevalent use of such data involves making assumptions about user interests based on past interactions, such as predicting which books a user will be interested in based on his past ratings of other books.

At modern data scales, distributed processes for matrix factorization are essential to achieving reasonable performance. For example, a large matrix according to modern data scales may be comprised of millions of rows, millions of columns, and billions of non-zero elements. However, in practice, exact factorization is generally not practical or desired, so virtually all matrix factorization processes actually produce low-rank approximations. A prominent application of matrix factorization involves minimizing a "loss function" that measures the discrepancy between an original input matrix and a product of the factors returned by the process. Use of the term "matrix factorization" herein refers to such loss function matrix factorizations, unless specified otherwise. Such factorizations are at the center of the widely known "Netflix® contest" of recommending movies to customers. Netflix® is registered trademark of Netflix, Inc.

Netflix®, Inc. provides tens of thousands of movies for rental to more than fifteen million customers. Each customer is able to provide a feedback rating for each movie on a scale of 1 to 5 stars. The following illustrates a simple, non-limiting example of a movie feedback matrix. Certain feedback ratings in the matrix, represented by question marks (?), are unknown, for example, because the user has not yet rated the movie:

$$\begin{array}{c} \\ \text{Alice} \\ \text{Bob} \\ \text{Charlie} \end{array} \begin{pmatrix} \text{Movie 1} & \text{Movie 2} & \text{Movie 3} \\ ? & 4 & 2 \\ 3 & 2 & ? \\ 5 & ? & 3 \end{pmatrix}$$

Each entry may contain additional data, such as the date of the rating or click history information. A main goal of factorization is to predict the missing entries in the feedback matrix. According to the Netflix® recommender system, entries with a predicted rating may be selectively recommended to other users for viewing. In addition to this recommender system, other related recommender systems have been attempted according to existing technologies, such as product recommender systems utilized by Amazon® and eBay®, content recommender systems such as the system provided by Digg®, and music recommender systems such as the system provided by Last.fm®. Amazon® is a trademark of Amazon.com, Inc. or its affiliates. Digg® is a registered trademark of Digg Inc. eBay® is a registered trademark of eBay Inc. Last.fm® is a registered trademark of Audioscrobbler Limited LLC.

The traditional matrix factorization problem may be defined according to the following: given an M×N matrix V and a rank R, find an M×R matrix W and an R×N matrix H such that V=WH. A primary goal is to obtain a low-rank approximation V≈WH, where the quality of the approximation may be described as an application-dependent loss function L. Methods may be configured to find the following value:

$$\underset{W;H}{\mathrm{argmin}}\, L(V; W; H)$$

This value represents the choice of W and H that give rise to the smallest loss. For example, assuming that missing ratings are coded with the value zero (0), loss functions for recommender systems are often based on the following nonzero squared loss:

$$L_{NZSL} \Sigma_{i,j: V_{ij} \ne 0} (V_{ij} - [WH]_{ij})^2,$$

where regularization terms are usually incorporate into the function, such as user and subject biases (e.g., movie biases), time drifts, and implicit feedback.

Figure 4:
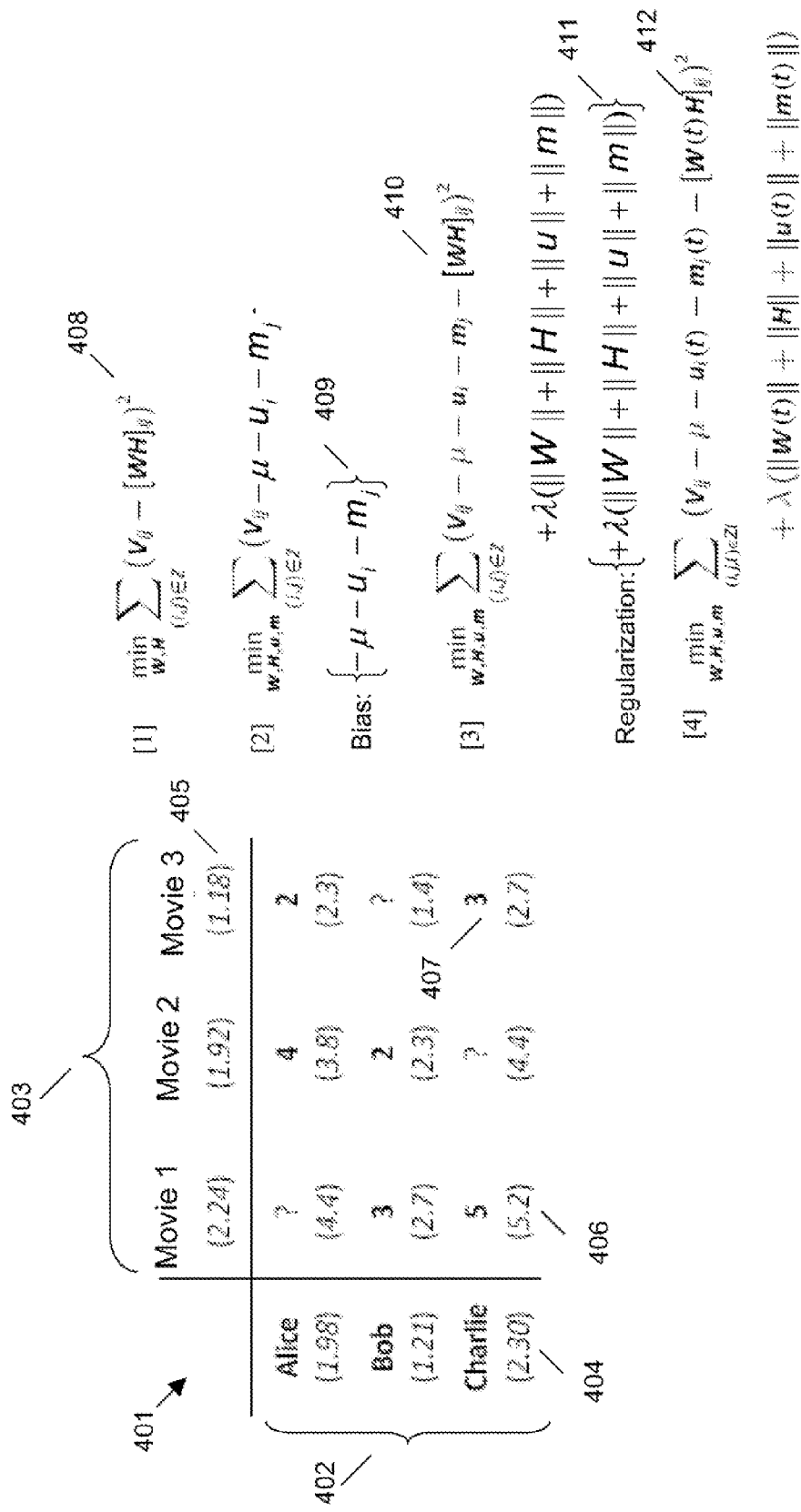
FIG. 4 provides an example matrix modeling a movie feedback system.

Referring to FIG. 4, therein is depicted an example matrix modeling a movie feedback system and an associated loss function for determining missing matrix values according to an embodiment. A matrix 401 has three rows 402 labeled Alice, Bob, and Charlie and three columns 403 labeled Movie 1, Movie 2, and Movie 3. The rows 402 represent movie feedback system users, while the columns 403 represent movies available within the system. Each user is associated with a "user factor" 404 and each movie is associated with a "movie factor" 405. In the example depicted in FIG. 4, a user's estimated movie rating 406 is found by multiplying the respective movie 405 and user 404 factors, which are represented by the matrix entries enclosed within parentheses. Matrix entries not enclosed in parentheses represent actual movie ratings 407 given by system users and question marks (?) are entries with unknown feedback.

Although only one user factor 404 and one movie factor 405 are depicted in FIG. 4, multiple factors are possible. For example, a movie factor 405 may involve the level of violence, the time period of the movie, or an intended demographic, while user factors 404 may involve whether the user likes certain movie categories or genres, such as science fiction. If multiple movie and user factors 404, 405 are used, the estimated movie factor 406 may be determined through a dot product operation.

FIG. 4 provides a first loss function 408 associated with the matrix 401, wherein V represents the actual movie rating 407, W represents the user factor 404, and H represents the movie factor 405. A second loss function 409 represents the first loss function 407 augmented to take bias 410 into account. For example, bias 409 may remove certain user biases, such as users who rate nearly every movie highly, or users who give nearly every movie a low rating. A third loss function 411 modifies the second loss function 409 to implement regularization 412, wherein the number of user factors 404 and the number of movie factors 405 are selected for applicability to data outside of the training data. For example, regularization serves to prevent "over fitting" of the data, wherein the factors 404, 405 become customized for the training data but are less effective for data outside of this training set. A fourth loss function 412 is configured to account for time in the factorization process. For example, certain movies may be viewed and rated more highly during certain times, such as seasonal movies, and a user's preferences may change over time.

Figure 5:
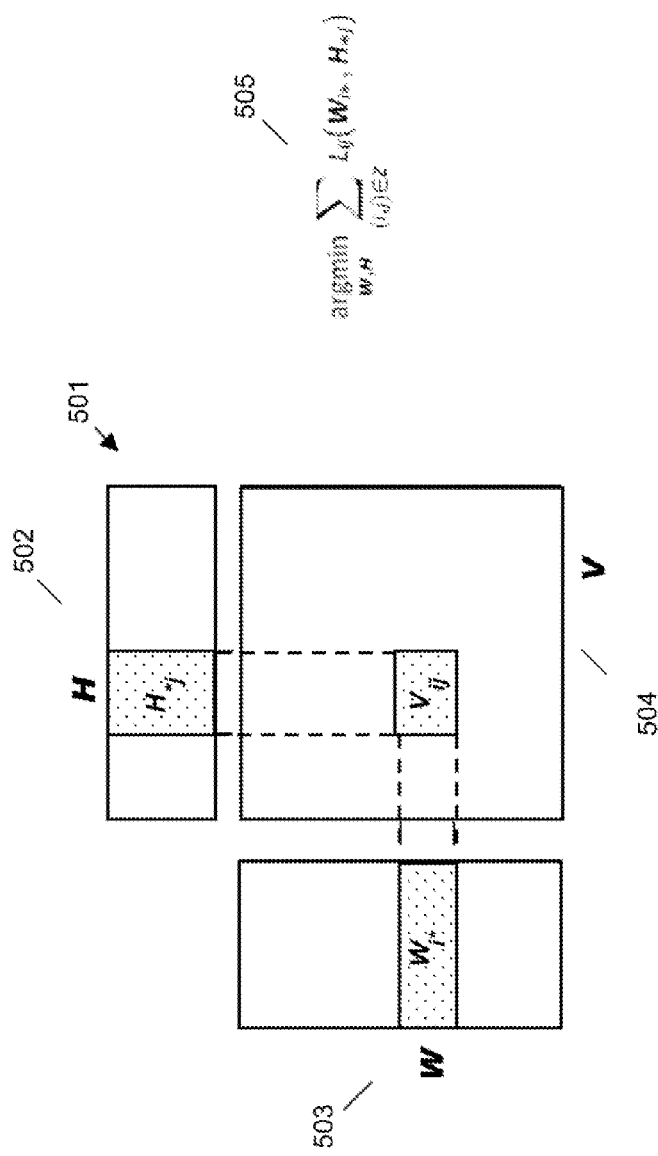
FIG. 5 provides an example of generalized matrix factorization.

Referring to FIG. 5, therein is depicted an example of generalized matrix factorization, which may be utilized for various problems, including, but not limited to, machine learning problems such as recommender systems, text indexing, medical diagnosis, or face recognition. A generalized matrix 501 is illustrated in FIG. 5, and is comprised of row factors (H) 502, column factors (W) 503, and an input matrix (V) 504. V 504 represents training data as an M×N matrix. W 503 and H 502 represent the parameter space. W 503 involves row factors, such as M×R, wherein R represents certain latent factors, and H 502 involves column factors, such as R×N. Embodiments provide for model processes to determine the loss at a particular element. Such models may include certain factors, such as prediction error, regularization, and auxiliary information. As such, a model process 505 is provided in FIG. 5, that is configured to determine the loss at element (I, J), wherein Z represents a training subset of indexes in V because not all values are known.

Embodiments provide for loss functions, like $L_{NZSL}$, above, that may be decomposed into a sum of local losses over a subset of the entries in $V_{IJ}$. According to embodiments, such loss functions may be written according to the following:

$$L = \sum_{(i,j) \in Z} l(V_{ij}, W_{i*}, H_{*j}), \quad (4)$$

for training set $Z \subseteq \{1, 2, \ldots, M\} \times \{1, 2, \ldots, N\}$ and local loss function L, where $A_{I*}$ and $A_{*J}$ denote row I and column J of matrix A, respectively. Many conventional loss functions, such as squared loss, generalized Kullback-Leibler divergence (GKL), and LP regularization, may also be decomposed in such a manner. In addition, a given loss function L has the potential to be decomposed in multiple other ways. Accordingly, certain embodiments focus primarily on the class of nonzero decompositions, in which $Z=\{(I,J): V_{IJ} \neq 0\}$ refers to the nonzero entries in V. Such decompositions may occur naturally when zeros represent missing data. Although certain embodiments may use nonzero decompositions, embodiments as described herein are not so limited, as any appropriate decomposition may be used.

Figure 6:
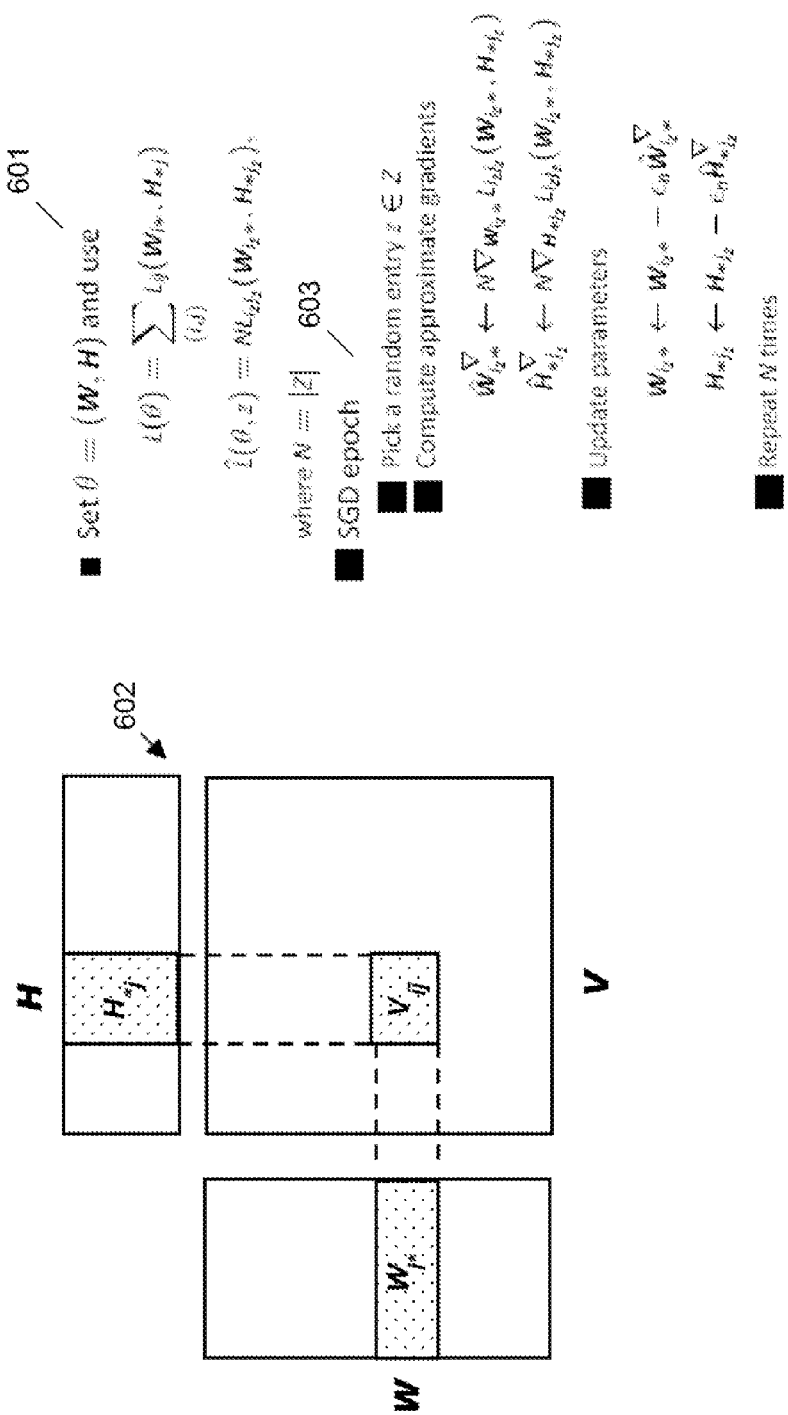
FIG. 6 provides an example of stochastic gradient descent (SGD).

SGD may be applied to matrix factorization by, inter glia, setting $\theta=(W, H)$ and decomposing the loss L, for example, as in equation (4), for an appropriate training set Z and local loss function L. The local loss at position $z=(I,J)$ may be denoted by $L_Z(\theta)=L_{ij}(\theta)=l(V_{ij},W_{i*},H_{*j})$. Using the sum rule for differentiation, $L'(\theta)$ may be defined according to the following: $L'(\theta)=\Sigma_Z L'(\theta)$. In addition, DGD methods may exploit the summation form of $L'(\theta)$, for example, they may compute the local gradients $L_z'(\theta)$ in parallel and sum up. In contrast, SGD obtains noisy gradient estimates by scaling up just one of the local gradients, for example, $\hat{L}'_Z(\theta)=NL_Z'(\theta)$, where $N=|Z|$ and the training point z is chosen "randomly" from the training set. FIG. 6 provides an example SGD for a matrix factorization process, including an example matrix 601, and an associated loss function 602 and epoch 603 determination both configured for SGD.

Replacing exact gradients (DGD) by noisy estimates (SGD) is beneficial for multiple reasons. A main reason is that exact gradient computation is costly, whereas noisy estimates are quick and easy to obtain. In a given amount of time, many quick-and-dirty SGD updates may be performed instead of a few, carefully planned DGD steps. The noisy SGD process may also allow for the escaping of local minima, such as those with a small basin of attraction, especially in the beginning when step sizes are likely to be large. In addition, SGD is able to exploit repetition within the data. Parameter updates based on data from a certain row or column may also decrease the loss in similar rows and columns. Thus, the more data similarity, the better SGD is likely to perform. Accordingly, the increased number of steps may leads to faster convergence, which has been observed in certain cases of large-scale matrix factorization.

Recently, more programmer-friendly parallel processing frameworks, such as MapReduce, have been used for data collection and processing. A result is that web-scale matrix factorizations have become more practicable and of increasing interest to consumers and users of massive data. MapReduce may be used to factor an input matrix, but may also be used to efficiently construct an input matrix from massive, detailed raw data, such as customer transactions. Existing technology has facilitated distributed processing through parallel matrix factorization processes implemented on a MapReduce cluster. However, the choice of process was generally driven by the ease with which it could be distributed.

To compute W and H on MapReduce, processes according to existing technology generally start with certain initial factors, such as $W_0$ and $H_0$, and iteratively improve on them. The M×N input matrix V may then be partitioned into $D_1 \times D_2$ blocks, which are distributed in a MapReduce cluster. Both row and column factors may be blocked conformingly as depicted in the following example matrix, where superscripts are used to refer to individual blocks:

$$\begin{array}{c} & H^1 & H^2 & \ldots & H^{D2} \\ W^1 \\ W^2 \\ \vdots \\ W^{D1} \end{array} \begin{pmatrix} V^{11} & V^{12} & \ldots & V^{1D2} \\ V^{21} & V^{22} & \ldots & W^{2D2} \\ \vdots & \vdots & \ddots & \vdots \\ V^{D11} & V^{D12} & \ldots & W^{D1D2} \end{pmatrix}$$

Such processes are designed such that each block $V^{IJ}$ can be processed independently in the map phase, taking only the corresponding blocks of factors $W^I$ and $H^J$ as input. In addition, some processes directly update the factors in the map phase wherein either $D_1=M$ or $D_2=N$ to avoid overlap, while others aggregate the results in a reduce phase.

Factorization processes may be classified into specialized processes, which are designed for a particular loss, and generic processes, which work for a wide variety of loss functions. Currently, specialized processes only exist for a small class of loss functions, such as EM-based and multiplicative-update methods for GKL loss. In the multiplicative-update method, the latter MULT approach may also be applied to squared loss and nonnegative matrix factorization with an "exponential" loss function (exponential NMF). Essentially, each of these example processes takes a previously developed parallel matrix factorization method and directly distributes it across the MapReduce cluster. For example, the widely used alternating least squares (ALS) method may handle factorization problems with a nonzero squared loss function and an optional weighted L2 regularization term. This approach requires a double-partitioning of V, with one partition by row and another partition by column. In addition, this method may require that each of the factor matrices, namely W and H, fit alternately in main memory.

On the other hand, generic processes are able to handle differentiable loss functions that decompose into summation form. One common approach is distributed gradient descent, which distributes exact gradient computation across a computer cluster, and then performs centralized parameter updates using quasi-Newton methods such as L-BFGS-B. Partitioned SGD approaches make use of a similar idea where SGD is run independently and in parallel on partitions of the dataset, and parameters are averaged after each pass over the data (PSGD) or once at the end (ISGD). However, these approaches have not been applied to matrix factorization before and, similarly to L-BFGS-B, exhibit slow convergence in practice and need to store the full factor matrices in memory. This latter limitation is very often a serious drawback. For example, for large factorization problems, it is crucial that both the one or more matrices and the factors be distributed.

Distributing SGD is complicated by the fact that individual steps depend on each other. For example, equation (2) demonstrates that $\theta_n$ has to be known before $\theta_{n+1}$ can be computed. This characteristic leads to synchronization overhead that defies efforts to provide distributed processing. Nonetheless, in the case of matrix factorization, there are structural properties that can be exploited using SSGD, as described below.

Embodiments provide for a process for approximately factoring large matrices. Embodiments incorporate, inter alia, stochastic gradient descent (SGD), an iterative stochastic optimization process. According to certain embodiments, characteristics of the matrix factorization problem are exploited through SSGD, which may function on web-scale datasets, for example, using MapReduce. In addition, a variant of SSGD according to embodiments may operate in a fully distributed environment, thus providing a "distributed" SGD (DSGD). Embodiments provide that the convergence properties of DSGD may be established using certain processes, including, but not limited to, stochastic approximation theory and regenerative process theory.

The ability to perform SGD in a distributed environment is crucial to processing data of modern dimensions and scales. For example, current data scales may result in sparse, high-dimensional matrices, such as 16 bytes/matrix entry with 100 or more factors. In addition, modern data systems may require the creation of large, gigabyte size models for processing. Current technology requires many scans using iterative processes, resulting in expensive computations, including calculations involving many factors per matrix entry, inner-bound products, and CPU-bound processes. As such, DSGD according to embodiments has certain advantages over existing technology, including, but not limited to, significantly faster convergence and superior scalability because, inter alia, the process is able to operate in a distributed environment.

The SGD process demonstrates good performance in non-parallel environments and is very effective for matrix factorization, such as in a sequential setting. SGD may also be run in a distributed fashion when the input matrix exhibits a "D-monomial" structure. For example, a block-diagonal matrix with K blocks is D-monomial for all D≤K. Although few input matrices are D-monomial, the matrix may always be represented as a union of pieces that are each D-monomial. The pieces comprising the union may overlap to create overlapping pieces commonly referred to as "strata." DSGD according to certain embodiments may repeatedly and carefully select one or more stratum and process them in a distributed fashion. Embodiments use stratification techniques to derive a distributed factorization process, for example, a distributed factorization process with demonstrable convergence guarantees.

Embodiments provide for DSGD, a process for low-rank matrix factorization wherein both data and factors may be fully distributed. In addition, memory requirements are low for DSGD configured according to embodiments, which may be scaled to large matrices, such as matrices with millions of rows, millions of columns, and billions of non-zero elements. According to embodiments, DSGD is a generic process because it may be used for a variety of different loss functions, including, but not limited to, classes of factorizations that minimize a "non-zero loss." Classes of non-zero loss functions have many applications, including operations wherein a zero represents missing data and, therefore, would conventionally be ignored when computing loss. As a non-limiting example, one use of non-zero loss functions involves estimating missing values, such as a rating that a customer would likely give to a previously unseen movie.

Embodiments may utilize loss functions L having the following summation form $L(\theta) = \Sigma_{z \in Z} L_z(\theta)$. According to embodiments, a first definition provides that training points $z_1, z_2, \in Z$ are interchangeable if for all loss functions L having a summation form according to embodiments, all $\theta \in H$, and $\epsilon > 0$, wherein:

$$L'_{z_1}(\theta) = L'_{z_1}(\theta - \epsilon L'_{z_2}(\theta))$$

and $$L'_{z_2}(\theta) = L'_{z_2}(\theta - \epsilon L'_{z_1}(\theta)) \quad (5)$$

In addition, embodiments provide that two disjoint sets of training points $z_1, z_2 \subset Z$ are interchangeable if $z_1$ and $z_2$ are interchangeable for every $z_1 \in Z_1$ and $z_2 \in Z_2$. In addition, embodiments provide for swapping the order of SGD steps that involve interchangeable training points without affecting the final outcome. Furthermore, when $z_1$ and $z_2$ are interchangeable, the SGD steps become parallelized according to the following:

$$\theta_{n+2} = \theta_n - \epsilon \hat{L}'(\theta_n, Z_n) - \epsilon \hat{L}'(\theta_{n+1}, Z_{n+1})$$
$$= \theta_n - \epsilon \hat{L}'(\theta_n, Z_n) - \epsilon \hat{L}'(\theta_n, Z_{n+1})$$

Embodiments provide for utilizing simple criterion to determine interchangeability. According to embodiments, a first principle provides that two training points $z_1 = (I_1, J_1) \in Z$ and $z_2 = (I_2, J_2) \in Z$ may be interchangeable if they do not share a row or column, that is, $I_1 \neq I_2$ and $J_1 \neq J_2$. This is a direct consequence of the decomposition of the global loss into a sum of local losses. As such, since $L_{ij}(\theta) = l(V_{ij}, W_{i*}, H_{*j})$, embodiments provide for the following:

$$\frac{\partial}{\partial W_{i'k}} L_{ij}(\theta) = \begin{cases} 0 & \text{if } i \neq i' \\ \frac{\partial}{\partial W_{ik}} l(V_{i'k}, W_{i*}, H_{*j}) & \text{otherwise.} \end{cases}$$

$$\frac{\partial}{\partial H_{k'j}} L_{ij}(\theta) = \begin{cases} 0 & \text{if } j \neq j' \\ \frac{\partial}{\partial H_{kj}} l(V_{ij}, W_{i*}, H_{*j}) & \text{otherwise.} \end{cases}$$

for $1 \leq K \leq R$. The partial derivatives of $L_{IJ}$ from equation (4) may only depend on $v_{ij}$, row $w_{i*}$, and column $H_{*J}$, while equation (1) may only be nonzero for row $w_{I*}$ and column $H_{*J}$. When $I_1 \neq I_2$ and $J_1 \neq J_2$, both $\theta$ and $\theta - \in L_{Z_1}(\theta)$ agree on the values of $w_{I2*}$ and $H_{*J2}$ for any choice of $\theta$, in accordance with the second part of equation (5). If two blocks, or submatrices, of V share neither rows nor columns, then the set of training points contained in these blocks may be interchangeable.

Embodiments exploit the structure of the matrix factorization problem to derive a distributed process for matrix factorization via SGD. FIG. 7 provides an example process of SGD for matrix factorization. The following depicts a block-diagonal training matrix according to a non-limiting simple matrix example.

$$\begin{array}{c} & H^1 \quad H^2 \quad \ldots \quad H^D \\ \begin{array}{c} W^1 \\ W^2 \\ \vdots \\ W^D \end{array} & \begin{pmatrix} Z^1 & 0 & \ldots & 0 \\ 0 & Z^2 & \ldots & \vdots \\ \vdots & \vdots & \ddots & 0 \\ 0 & \ldots & 0 & Z^D \end{pmatrix} \end{array} \quad (6)$$

For a given training set z, the corresponding training matrix is denoted by Z. The corresponding training matrix is obtained by zeroing out the elements in V that are not in z, these elements usually represent missing data or held-out data for validation.

In this non-limiting example, the rows and columns are blocked conformingly and the set of training points in block $z^b$ is denoted by $z^b$. Embodiments exploit a key property wherein, according to the first principle described above, $z^I$ is interchangeable with $z^J$ for I≠J. In this non-limiting example, for some T∈[1,∞), T steps of SGD are run on z, starting from some initial point $\theta_0$ and using a fixed step size ∈. According to embodiments, an instance of the SGD process may be described by a training sequence w=($z_0, z_1, \ldots, z_{T-1}$) of T training points. Designating $\theta_0(w)=\theta_0$, the following definition is ascertained according to an embodiment:

$$\theta_{n+1}(w) = \theta_n(w) + \in Y_n(w),$$

where the update term $Y_n(w) = -NL'_{w_n}(\theta_n(w))$ represents a scaled negative gradient estimate. In addition, $\theta_{T(W)}$ may be written according to the following:

$$\theta_{T(w)} = \theta_0 + \in \sum_{n=0}^{T-1} Y_n(w) \quad (7)$$

As an illustrative and non-restrictive example, for the subsequence $\sigma_b(w) = w \cap Z^b$ of training points from block $Z^B$, the subsequence has length $T_b(w) = |\sigma_b(w)|$. According to embodiments, SGD may run on each block independently and the results summed together.

Using the formulations of $\theta_{n+1}(w)$ and $\theta_{T(W)}$ provided above, embodiments provide for the following second principal:

$$\theta_{T(w)} = \theta_0 + \in \sum_{d=1}^{d} \sum_{k=0}^{T_b(w)-1} Y_k(\sigma_b(w)) \quad (8)$$

According to embodiments, a one-to-one correspondence is established between the update terms $Y_n(w)$ in equation (7) and $Y_k(\sigma_b(w))$ in equation (8) (i.e., the second principle). The $(K+1)^{th}$ element in $\sigma_b(w)$, that is, the $(K+1)^{th}$ element from block $Z^B$ in w, may be denoted by $z_{b,k}$. The zero-based position of this element in w may be denoted by $\pi(z_{b,k})$. Accordingly, embodiments arrive at the following: $w_{\pi(z_{b,k})}$. For the first element $z_{B,0}$ from block B, $z_n \notin Z^b$ for all previous elements n<$\pi(,0)$. In addition, because the training matrix is block-diagonal, blocks have pairwise disjoint rows and pairwise disjoint columns. Thus, embodiments provide that according to the first principal described above, $z_{B,0}$ is interchangeable with each of the $z_N$ for N<$\pi(z_{b,0})$. As such, $z_N$ may be eliminated one by one according to the following:

$$Y_{\pi(z_{b,k})}(w) = -NL'_{z_{b,0}}(\theta_{\pi(z_{b,0})}(w))$$
$$= -NL'_{z_{b,0}}(\theta_{\pi(z_{b,0})-1}(w))$$
$$= NL'_{z_{b,0}}(\theta_0)$$
$$= Y_0(\sigma_b(w))$$

The update terms may be safely removed from elements not in block $Z^B$, and by induction on K, wherein the following may be obtained:

$$Y_{\pi(z_{b,k})}(w) = -NL'_{z_{b,k}}\left(\theta_0 + \in \sum_{n=0}^{\pi(z_{b,k})-1} Yn(w)\right) \quad (9)$$
$$= -NL'_{z_{b,k}}\left(\theta_0 + \in \sum_{l=0}^{k-1} Y_{\pi(z_{b,l})}(\sigma_b(w))\right)$$
$$= Y_k(\sigma_b(w))$$

According to embodiments, an assertion of the second principle may result from the following:

$$\theta_T(w) = \theta_0 + \in \sum_{n=0}^{T-1} Y_n(w)$$
$$= \theta_0 + \in \sum_{b=1}^{d} \sum_{k=0}^{T_b(w)-1} Y_{\pi(z_{b,k})}(w)$$
$$= \theta_0 + \in \sum_{b=1}^{d} \sum_{k=0}^{T_b(w)-1} Y_{(k)}(\sigma_k(w)),$$

where the update terms are first re-ordered, followed by the use of equation (9).

In the non-limiting simple matrix example, first described above, the fact that Z is block-diagonal is utilized only to establish interchangeability between blocks. As such, embodiments provide that the second principle, described above, may also apply when the matrix is not block-diagonal, but still may be divided into interchangeable sets of training points.

Embodiments provide that the second principle, described above, may be exploited for distributed processing on MapReduce. According to embodiments, W and H are blocked conformingly to Z, as provided in equation (6), and processing is divided into D independent map tasks $J_1, \ldots, J_D$. Embodiments provide that task $J_B$ is responsible for subsequence $\sigma_b(w)$, receiving $z^B$, $w^B$, and $H^B$ as input, performing block-local updates $\sigma_b(w)$, and producing updated factor matrices $W_{new}^b$ and $H_{new}^b$. According to embodiments, by the second principle, the following matrices may be obtained:

$$W' = \begin{pmatrix} W_{new}^1 \\ \vdots \\ W_{new}^d \end{pmatrix} \text{ and } H' = (H_{new}^1 \ldots H_{new}^d)$$

where W' and H' are the matrices obtained by running sequential SGD on W. Since each task accesses different parts of both training data and factor matrices, embodiments provide that the data may be distributed across multiple nodes and the tasks can run simultaneously.

Embodiments provide that the DSGD process stratifies the training set z into a set S={$z_1, \ldots, z_Q$} of Q strata so that each individual stratum $z_s \subset z$ may be processed in a distributed fashion. Embodiments ensure that each stratum is "d-monomial," as defined below. According to embodiments, the D-monomial property generalizes the block diagonal structure, while still permitting the application of techniques such as those discussed with the non-limiting simple matrix example, introduced above. In general, the parallelism parameter D is greater than or equal to the number of available processing tasks.

Embodiments provide for a second definition wherein a stratum $Z_s$ is D-monomial if it can be partitioned into D non-empty and mutually disjoint subsets $Z_s^1, Z_s^2, \ldots, Z_s^d$ such that $i \neq i'$ and $j \neq j'$ whenever $(i,j) \in Z_s^{b_1}$ and $(i',j') \in Z_s^{b_2}$ with $b_1 \neq b_2$. In addition, a training matrix $Z_s$ is D-monomial if it is constructed from a D-monomial stratum $Z_s$.

Embodiments may stratify a training set according to the second definition, provided above, in many ways. One non-limiting example utilizes data-independent blocking, while other non-limiting examples may employ more advanced strategies that may further improve convergence speed. According to embodiments, the rows and column of Z are permutated randomly, then D×D blocks of size $$\frac{m}{d} \times \frac{n}{d}$$

are created, and the factor matrices W and H are blocked conformingly. This process ensures that the expected number of training points in each of the blocks is the same, namely, $N/D^2$. For a permutation $J_1, J_2, \ldots, J_D$ of $1, 2, \ldots, D$, a stratum may then be defined as $Z_s = Z^{1j_1} \cup Z^{2j_2} \cup \ldots \cup Z^{dj_d}$, where the substratum $Z^{ij}$ denotes the set of training points that fall within block $Z^{ij}$. Embodiments provide that a stratum $Z_s$ may be represented by a template $\tilde{Z}_s$ that displays each block $Z^{ij}$ corresponding to a substratum $Z^{ij}$ of $Z_s$, with all other blocks represented by zero matrices. As such, when D=2, for example, two strata may be obtained, which may be represented by the following templates:

$$\tilde{Z}_1 = \begin{pmatrix} Z^{11} & 0 \\ 0 & Z^{22} \end{pmatrix} \text{ and } \tilde{Z}_2 = \begin{pmatrix} 0 & Z^{12} \\ Z^{21} & 0 \end{pmatrix}$$

The set S of possible strata contains D! elements, one for each possible permutation of $1, 2, \ldots, D$. In addition, different strata may overlap when D>2. Furthermore, there is no need to materialize these strata as they are constructed on-the-fly by processing only the respective blocks of Z. The actual number of training points in stratum $Z_s$ may be denoted by $N_s = |Z_s|$. In addition, given a training point $(i,j) \in Z_s$, the derivative $L'_S(\theta) = \Sigma_{(k,l) \in Z_s} L'_{kl}(\theta)$ may be estimated by $\hat{L}'_S(\theta) = N_s L_{ij}(\theta)$.

Embodiments may group the individual steps of DSGD into "subepochs" that each process one of the strata. According to embodiments, DSGD may use a sequence $\{(\xi_k, T_k)\}$, where $\xi_k$ denotes the stratum selector used in the $k^{th}$ subepoch, and $T_K$ the number of steps to run on the selected stratum. This sequence of pairs uniquely determines an SSGD stratum sequence, including, but not limited to, the following sequence: $\gamma_1 = \ldots = \gamma_{T1} = \xi_1, \gamma_{T1+1} = \ldots = \gamma_{T1+T2} = \xi_2$. Embodiments provide that the $\{(\xi_k, T_k)\}$ sequence may be selected such that the underlying SSGD process, and hence the DSGD factorization process, is guaranteed to converge. According to embodiments, once a stratum $\xi_k$ has been selected, $T_K$ SGD steps may be performed on $Z_{\xi_k}$. In addition, embodiments provide that these steps may be distributed and performed in parallel.

Referring to FIGS. 8A-8C, therein is illustrated an example DSGD process according to an embodiment. DSGD according to embodiments provides for a first step wherein data is blocked and distributed. For example FIG. 8A illustrates a matrix (v) 801A that has been partitioned into a 3×3 grid according to an embodiment. v 801A has interchangeability properties such that v 801A may be processed on the diagonal, as illustrated by matrix (v) 801B of FIG. 8B, in parallel.

The example DSGD process as depicted in FIGS. 8A-8C provides for the following steps according to an embodiment: (1) select a diagonal set of blocks, for example, a set of interchangeable blocks, one per row; (2) perform SGD on the diagonal, in parallel; (3) merge the results; and (4) proceed to the next diagonal set of blocks. According to embodiments, steps (1)-(3) comprise a "cycle." In addition, the set of blocks selected through step (1) is described herein as a "stratum." Embodiments provide that a set of blocks does not necessarily have to be diagonal, as this configuration is purely for demonstrative purposes. Any appropriate configuration will operate within the process as described herein. For example, embodiments provide for any configuration wherein the applicable portions of data may be processed in parallel, as illustrated in FIG. 8C, where the sequential simulation of SGD is processed in parallel according to embodiments.

As depicted in FIGS. 8A-8C, performing SGD over each stratum only estimates the gradient over three blocks, while the total gradient is the sum of the loss over all nine blocks of v 801A. Processing each stratum individually produces a gradient in the wrong direction. However, if the process progresses from stratum to stratum, such that all of the data are eventually taken into consideration, the resultant gradients will average out and produce the minimum loss. In addition, according to embodiments, each stratum may be processed in parallel and in a distributed manner.

Referring to FIG. 9, therein is depicted a DSGD process for matrix factorization according to an embodiment, wherein an epoch is defined as a sequence of D subepochs. According to embodiments, an epoch may roughly correspond to processing the entire training set once. Embodiments provide that executing the DSGD process depicted in FIG. 9 on D nodes in a shared-nothing environment, such as MapReduce, may only require that the input matrix be distributed once. Accordingly, the only data that may require transmission between nodes during subsequent processing may be the small factor matrices. As a non-limiting example, if node I stores blocks $W^i$, $Z^1, Z^2, \ldots, Z^{ID}$ for $1 \leq I \leq D$ then only matrices $H^1, H^2, \ldots, H^d$ need to be transmitted.

Embodiments provide that, by construction, parallel processing leads to the same update terms as the corresponding sequential SGD on $Z_{\xi_k}$, and the correctness of DSGD may be implied by the correctness of the underlying SSGD process.

The following provides a non-limiting training example according to embodiments. Processing a subepoch (i.e., a stratum) according to embodiments does not comprise generating a global training sequence and then distributing it among blocks. Rather, embodiments provide that each task generates a local training sequence directly for its corresponding block. This reduces communication cost and avoids the bottleneck of centralized computation. Good training results are more likely when, inter alia, the local training sequence covers a large part of the local block, and the training sequence is randomized. In the non-limiting training example, a block $Z^{ij}$ is processed by randomly selecting training points from $Z^{ij}$ such that each point is selected precisely once. This ensures that many different training points are selected in the non-limiting training example, while at the same time maximizing randomness. The third principle, discussed above, implicitly assumes sampling with replacement, but embodiments provide that it may be extended to cover other strategies as well, including redefining a stratum to consist of a single training point and redefining the stratum weights $w_S$, accordingly In addition, the non-limiting training example concerns stratum selection. According to embodiments, a stratum sequence $(\xi_k, T_k)$ determines which of the strata are chosen in each subepoch and how many steps are run on that stratum. The training sequences selected in the non-limiting training example are $T_k = N_{\xi_k} = Z_{\xi_k}$. For the data independent blocking scheme, each block $z^{ij}$ occurs in (D-1)! of the D! strata. As such, embodiments provide that all strata do not have to be processed in order to cover the entire training set of the non-limiting training example.

The non-limiting training example processes a large part of the training set in each epoch, while at the same time maximizing randomization. Accordingly, in each epoch, a sequence of D strata is selected such that the D strata jointly cover the entire training set. In addition, the sequence is picked uniformly and at random from all such sequences of D strata. This selection process is covered by the third principle, introduced above, wherein each epoch corresponds to a regenerative cycle. The third principle implies that $w_S$ corresponds to the long-term fraction of steps run on stratum $z_S$ (otherwise $E[x_1(s)] \neq 0$ for some s). Conversely, this strategy corresponds to a specific choice of stratum weights, namely $w_S \propto N_S$. This is due to selecting each stratum s equally often in the long run, and always performing $N_S$ steps on stratum s. Accordingly, embodiments provide that $\{w_S\}$ satisfies equation (3) for all z and L of the form depicted in equation (4), if and only if the following:

$$\sum_{s: Z_s \supset Z_{ij}} w_s \frac{N}{N_s} = 1 \quad (10)$$

for each substratum $z^{ij}$. Accordingly, strategies ensuring that each $z^{ij}$ appear in exactly (D-1)! strata imply equation (10) for the choice of $w_S \propto N_S$.

Furthermore, the non-limiting training example concerns step size selection. Stochastic approximation according to current technology often works with step size sequences roughly of form $\epsilon_n = 1/n^\alpha$ with a $\alpha \in (0.5, 1]$. The third principle, discussed above, guarantees asymptotic convergence for such choices. However, deviation from these choices may allow for faster convergence over a finite number of executed steps. In contrast to SGD in general, embodiments may determine the current loss after every epoch. Accordingly, embodiments may check whether an epoch decreased or increased the loss.

Embodiments employ a heuristic called "bold driver," which is often used for gradient descent. Starting from an initial step size $\epsilon_0$, embodiments increase the step size by a small percentage (for example, 5%) whenever a decrease of loss is experienced, and drastically decrease the step size (for example, by 50%) whenever an increase of loss is experienced. Within each epoch, the step size remains fixed. Selecting $\epsilon_0$ according to embodiments leverages the fact that many compute nodes are available. A small sample of z (for example, 0.1%) may be replicated to each node. Different step sizes are attempted in parallel. Initially, embodiments may make a pass over the sample for step sizes 1, ½, ¼, ..., $½^{D-1}$ which occur in parallel at all D nodes. The step size that gives the best result is selected as $\epsilon_0$. As long as loss decreases, a variation of this process is repeated after every epoch, wherein step sizes within a factor of [½, 2] of the current step size are attempted. Eventually, the chosen step size will become too large and the value of the loss will increase. As a non-limiting example, this may happen when the iterate has moved closer to the global solution than to the local solution of a given sample. Embodiments provide that responsive to detecting an increase of loss, the process may switch to the bold driver method for the rest of the process.

Certain experiments, referred to herein as the "DSGD comparison experiments," reveal that DSGD according to embodiments often converges faster than alternative methods. The DSGD comparison experiments implemented DSGD according to embodiments on top of MapReduce, along with implementations of PSGD, L-BFGS, and ALS methods. DSGD, PSGD, and L-BFGS are generic methods that work with a wide variety of loss functions, whereas ALS is restricted to quadratic loss functions. Two different implementations and compute clusters were utilized. A first implementation for in-memory experiments and one for large scale-out experiments on very large datasets using Hadoop, an opensource MapReduce implementation. The in-memory implementation is based on R and C, and uses R's snowfall package to implement MapReduce. This implementation targeted datasets that are small enough to fit in aggregate memory, for example, datasets with up to a few billion non-zero entries. The input matrix was blocked and distributed across the cluster before running each experiment. The second implementation was similarly based on Hadoop. The DSGD comparison experiments involving PSGD and DSGD used adaptive step size computation based on a sample of roughly 1 million data points. The bold driver was used as soon as an increase in loss was observed.

The Netflix® competition dataset was used for the DSGD comparison experiments on real data. The dataset contains a small subset of movie ratings given by Netflix® users, specifically, 100 million anonymized, time-stamped ratings from roughly 480 thousand customers on roughly 18 thousand movies. A synthetic dataset with 10 million rows, 1 million columns, and 1 billion nonzero entries was used for larger-scale DSGD comparison experiments on in-memory implementations. Matrices W* and H* were generated by repeatedly sampling values from a Gaussian(0,10) distribution. Subsequently, 1 billion entries from the product W*·H* were sampled, and Gaussian(0,1) noise was added to each sample. This procedure ensures that there exists a reasonable low-rank factorization. For all GSD comparison experiments, the input matrix was centered around its mean. The starting points $W_0$ and $H_0$ were chosen by sampling entries uniformly and at random from [−0.5, 0.5] and, generally, rank R=50 was used.

The DSGD comparison experiments used the loss functions plain nonzero squared loss ($L_{NZSL}$) and nonzero squared loss with an L2 regularization term ($L_{L2}$). These loss functions may be expressed as follows:

$$L_{NZSL} = \sum_{(i,j) \in Z} (V_{ij} - [WH]_{ij})^2$$

$$L_{L2} = L_{NZSL} + \lambda(\|W\|_F^2 - \|H\|_F^2)$$

Figure 10:
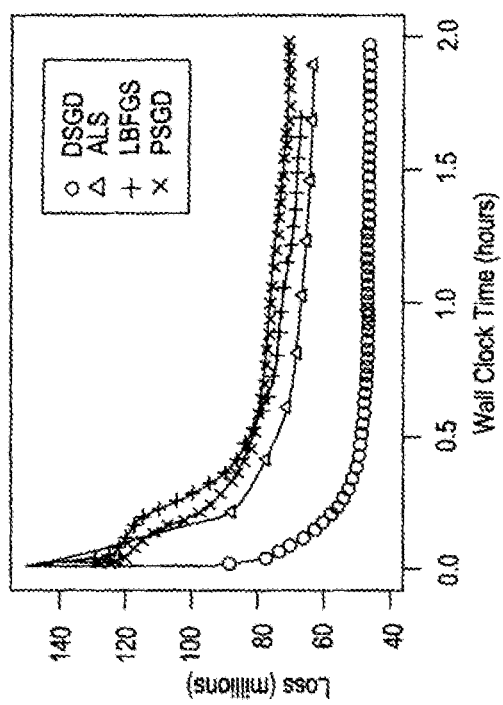
FIG. 10 provides a graph of results from DSGD comparison experiments.
Figure 11:
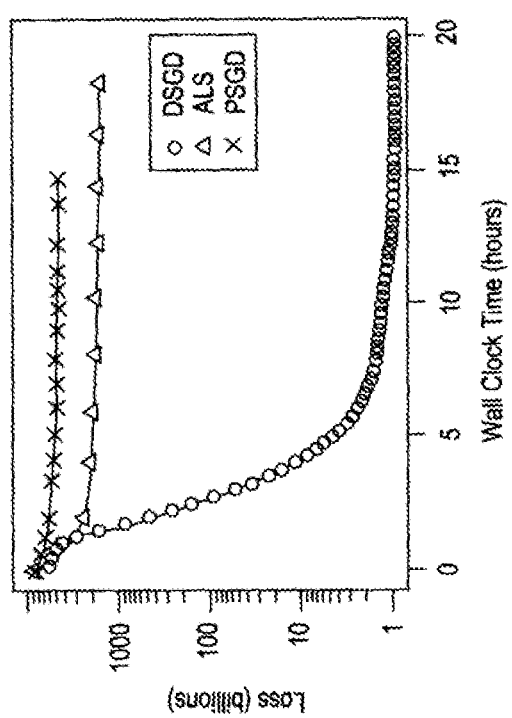
FIG. 11 provides another graph of results from DSGD comparison experiments.

In addition, for synthetic data and $L_{L2}$, a "principled" value of $\lambda = 0.1$ was used. This choice of $\lambda$ is "natural" in that the resulting minimum-loss factors correspond to the "maximum a posteriori" Bayesian estimator of W and H under the Gaussian-based procedure used to generate the synthetic data. Representative results of the DSGD comparison experiments are depicted in FIGS. 10 and 11. Although specific loss functions are described herein, these functions are not exhaustive as embodiments are configured to operate using any applicable loss function. For example, certain embodiments may use the following additional loss functions:

$$L_{NZL2} = L_{NZSL} + \lambda(\|N_1 W\|_F^2 - \|HN_2\|_F^2)$$
$$L_{GKL} = \sum_{i,j \in z} (V_{ij} \log V_{ij} / |WH|_{ij} - V_{ij}) + \sum_{i,j} |WH|_{ij}$$

In addition, certain other experiments involving DSGD according to embodiments reveals that DSGD has good scalability properties, including, but not limited to, when implemented using Hadoop. In addition, certain other experimental observations include that DSGD according to embodiments may require only simple aggregates per tuple, and that increased randomization increases convergence efficiency.

Figure 12:
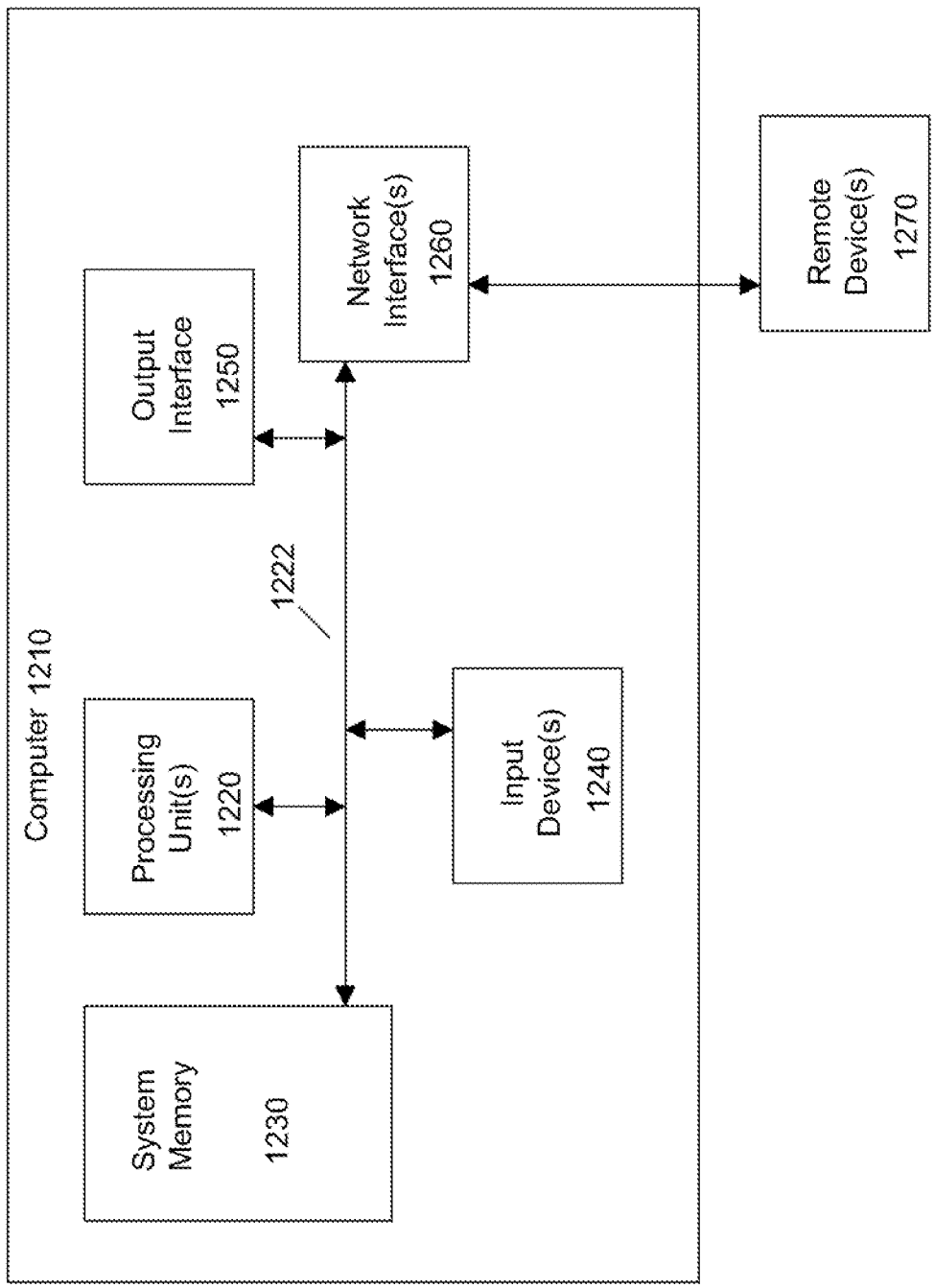
FIG. 12 illustrates an example computer system.

Referring to FIG. 12, it will be readily understood that embodiments may be implemented using any of a wide variety of devices or combinations of devices. An example device that may be used in implementing one or more embodiments includes a computing device in the form of a computer 1210. In this regard, the computer 1210 may minimize a loss function by decomposing the loss function into component loss functions and minimizing each of the component loss functions according to a sequence using gradient descent.

A user can interface with (for example, enter commands and information) the computer 1210 through input devices 1240. A monitor or other type of device can also be connected to the system bus 1222 via an interface, such as an output interface 1250. In addition to a monitor, computers may also include other peripheral output devices. The computer 1210 may operate in a networked or distributed environment using logical connections to one or more other remote computers or databases. In addition, Remote devices 1270 may communicate with the computer 1210 through certain network interfaces 1260. The logical connections may include a network, such as a local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, et cetera) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method comprising:
   decomposing a primary loss function into stratum loss functions, each of the stratum loss functions having a non-zero weight applied thereto;
   decreasing a stratum loss to a predefined stratum loss threshold for each of the stratum loss functions by processing each of the stratum loss functions individually using gradient descent, the non-zero weights remaining as non-zero weights throughout said decreasing; and
   decreasing a primary loss to a predefined primary loss threshold of the primary loss function by processing each of the stratum loss functions according to a stratum sequence, the sequence being chosen to establish convergence to at least one of: stationary points of the primary loss function, and chain-recurrent points of the primary loss function.

2. The method according to claim 1, wherein processing each of the stratum loss functions individually using gradient descent comprises using stochastic gradient descent.

3. The method according to claim 1, wherein the stratum sequence is decomposed into consecutive, independent and identically distributed cycles.

4. The method according to claim 1, wherein each of the stratum loss functions corresponds to a partition of an underlying dataset.

5. The method according to claim 1, wherein the predefined primary loss threshold comprises a minimum primary loss.

6. The method according to claim 1, further comprising:
   partitioning a matrix as a union of matrix strata;
   determining a sequence of the matrix strata;
   decomposing a matrix loss function into matrix stratum loss functions, each stratum loss function configured to minimize a loss of at least one matrix stratum;
   decreasing a matrix stratum loss to a predefined matrix stratum loss threshold for each of the matrix stratum loss functions by processing each of the matrix stratum loss functions individually using stochastic gradient descent; and
   decreasing a matrix loss to a predefined matrix loss threshold of the matrix loss function by processing the matrix stratum loss functions according to a matrix stratum sequence.

7. The method according to claim 6, wherein each of the at least one matrix stratum comprise one or more interchangeable blocks.

8. The method according to claim 7, wherein each of the at least one matrix stratum are processed in parallel.

9. The method according to claim 8, further comprising:
   communicating with at least one processing node;
   wherein processing of the at least one matrix stratum is distributed across the at least one processing node.

10. The method according to claim 1, wherein:
    the primary loss function comprises a global loss function; and
    the stratum loss functions comprise local loss functions.

11. The method according to claim 10, wherein said decomposing comprises decomposing a global loss into a sum of local losses.

12. The method according to claim 1, wherein said processing of each of the stratus loss functions comprises minimizing a first stratum loss function and then minimizing a second stratum loss function.

13. The method according to claim 1, wherein the stratum loss functions correspond to strata, the strata comprising partitions of an underlying dataset.

* * * * *